United States Patent Office 3,725,202
Patented Apr. 3, 1973

3,725,202
ENZYME TREATMENT
William Harold White, Fulton, Ill., and Robert George Dworschack, Clinton, Iowa, assignors to Standard Brands Incorporated, New York, N.Y.
No Drawing. Filed July 19, 1971, Ser. No. 164,058
Int. Cl. C07g 7/02
U.S. Cl. 195—66 R                                10 Claims

ABSTRACT OF THE DISCLOSURE

The disclosure is directed to a method of treating enzyme preparations containing glucoamylase and transglucosidase to substantially reduce the transglucosidase present therein with silver or mercuric ions. The treated enzyme preparations may be used to convert starch to dextrose.

THE INVENTION

This invention relates to the treatment of enzyme preparations containing glycoamylase and transglucosidase. More specifically, the invention relates to the treatment of enzyme preparations containing glucoamylase and transglucosidase to substantially reduce the transglucosidase present therein.

The principal use of enzyme preparations containing glucoamylase is for converting starch to dextrose. Methods of using glucoamylase for producing dextrose and dextrose containing syrups, such as corn syrups, are well known in the art. These methods can be grouped into two broad categories. These are the acid-enzyme process and the enzyme-enzyme process. In the acid-enzyme process, for instance, starch is first partially hydrolyzed or liquefied, by forming an aqueous suspension containing 35 to 40 percent starch and incorporating therein an acid such as hydrochloric. The suspension is then heated to relatively high temperatures to partially hydrolyze the starch. This suspension may then be cooled and treated with a glucoamylase preparation at a suitable concentration and pH range to enzymatically convert the partially hydrolyzed starch to dextrose. The acid-enzyme process is disclosed, for example, in U.S. Patents 2,305,168; 2,531,999; 2,893,921; and 3,042,584.

In the enzyme-enzyme conversion process, generally, a starch slurry is formed and a starch liquefying enzyme, for instance, bacterial alpha-amylase, added and the starch slurry heated to partially hydrolyze the starch. The partial hydrolysis is usually carried out at a temperature in the range of 80° to 95° C. The D.E. of the slurry after partial hydrolysis may be in the range of from 10 to 20.

Any suitable starch liquefying enzyme may be used to partially hydrolyze the starch. Exemplary of such hydrolyzing enzymes are those produced by members of the *Bacillus subtilis* species, *Aspergillus niger* and other species of the Aspergillus genus and by malted cereal grain. The partially hydrolyzed starch slurry may then be treated with a glucoamylase preparation to convert the starch to dextrose.

The enzymatically converted hydrolysates are generally subjected to various carbon and ion exchange refining procedures well known in the art to remove color bodies, odoriferous materials and constituents which contribute to the ash content of the hydrolysates.

Glucoamylase has been referred to in the art as glucamylase, glucogenic enzyme, starch glucogenase and gamma-amylase.

Glucoamylase is elaborated by many types of microorganisms. For example, certain strains of fungi belonging to the Aspergillus group, such as strains belonging to the *Aspergillus niger* group and the *Aspergillus awamori* group and certain strains of the Rhizopus species will elaborate glucoamylase. Other types of enzymes are also generally elaborated by these microorganisms, for instance, transglucosidase and alpha-amylase. Thus a glucoamylase preparation generally contains transglucosidase and alpha-amylase.

Transglucosidase catalyzes the formation, particularly from maltose, of unfermentable dextrose polymers, such as isomaltose and oligosaccharides which contain alpha-D (1→6) glucosidic linkages. This is, of course, detrimental to the production of dextrose since lower yields thereof are obtained.

Alpha-amylase acts on starch to catalyze the formation of saccharides of lower molecular weight, such as maltose, which may be relatively easily broken down to dextrose by glucoamylase.

The presence of alpha-amylase is generally not considered detrimental to the production of dextrose; however, when relatively large quantities of it are present it does produce saccharides of the kind which are susceptible of being polymerized to unfermentable dextrose polymers by transglucosidase.

There are many methods known in the art directed to improving glucoamylase preparations. These methods are principally directed to removing or inactivating the transglucosidase. Such methods, for example, are disclosed in U.S. Patents 2,976,804; 3,042,584; 3,075,886; 3,117,063; 3,268,416; 3,303,102; 3,332,581; 3,380,892; and 3,483,085. Another approach which has been taken to improve glucoamylase preparations is mutating the microorganisms from which the glucoamylase is elaborated to obtain higher yields of glucoamylase and/or lesser amounts of transglucosidase. An example of this approach is described in U.S. Patent 3,012,944.

In the present method, an aqueous glucoamylase preparation containing transglucosidase is treated with a source of silver and/or mercuric ions. These ions preferentially inactivate the transglucosidase in the glucoamylase preparation. The preferred treatment is with a source of silver ions. The exact conditions under which the treatment is performed are dependent upon many variables, such as the concentration of the glucoamylase, alpha-amylase, transglucosidase and other proteinaceous materials present, and the pH and temperature at which the glucoamylase preparation is treated. Generally, at low pH values and at high temperatures lesser amounts of silver and mercuric ions are required. Of course, the pH and temperature at which the glucoamylase preparation is treated should not be such that will destroy or inactivate substantial quantities of the glucoamylase.

The silver or mercuric ions may be produced in the glucoamylase preparation by the addition of any water soluble salt thereof such as $AgNO_3$, $HgCl_2$, and the like. Although the amounts of silver and mercuric ions may vary for the reasons indicated above, generally, however, sufficient amounts of water soluble silver salts are incorporated into an aqueous glucoamylase preparation to provide a silver ion molarity of from about $1 \times 10^{-6}$ to about $8 \times 10^{-1}$. The preferred amount of water soluble silver salts used is sufficient to provide a silver ion molarity of from about $7 \times 10^{-2}$ to about $7 \times 10^{-3}$. In the case of water soluble salts of mercury the preferred amount is sufficient to obtain a mercuric ion molarity in the range of from about $1 \times 10^{-6}$ to about $6 \times 10^{-2}$.

The temperature at which the treatment is performed may be in the range of from ambient to about 60° C. However, it is preferred to carry out the treatment at a temperature in the range from about 30° C. to about 50° C.

The pH of the aqueous enzyme preparation during the treatment may vary, for instance, in the range of from about 2 to about 4.5. However, it is preferred that the pH of the aqueous enzyme preparation during the treatment be in the range of from about 3 to 4. As the pH of the aqueous preparation is decreased, there is the tendency for the transglucosidase to be inactivated due to the acidity of the preparation rather than the presence of the silver or mercuric ions.

In order to more clearly describe the nature of the present invention, specific examples will hereinafter be described. It should be understood, however, that this is done solely by way of example and is intended neither to delineate the scope of the invention nor limit the ambit of the appended claims. In the example and throughout this specification, percentages are utilized to refer to percent by weight, unless otherwise specified.

The analytical procedures and testing methods that were used in the following examples are described below.

DETERMINATION OF THE PRESENCE OF TRANSGLUCOSIDASE IN GLUCOAMYLASE PREPARATIONS 200 g. of maltose monohydrate were dissolved in about 500 ml. of water at a temperature of 40° C. The solution was filtered through a coarse, fritted glass filter, and the filter was then rinsed with about 50 ml. of water. Thirty ml. of a 2.0 molar solution of acetate buffer (2 molar acetic acid at pH of 4) were added to the filtered maltose solution. The buffered maltose solution was cooled to 25° C. and diluted to 1000 ml. The concentration of the maltose solution was adjusted so the specific rotation, $[\alpha]_D^{25}$, of maltose was in the range of 130.3° to 130.9°. The adjustment was made by either diluting the solution with water or by adding a small amount of maltose. The adjusted maltose solution served as the stock maltose substrate.

50 ml. of the stock maltose substrate was pipetted into a 100 ml. volumetric flask. To the substrate was added the glucoamylase preparation to be tested in the amounts of 4 glucoamylase units for 72 hour reaction or 8 glucoamylase units for a 24 hour reaction. After enzyme addition, the digest was diluted to 100 ml. with water and placed in a water bath maintained at 60° C. At the end of the reaction period, the digested maltose solution was cooled to 25° C. and the optical rotation was measured in a Bendix Automatic Polarimeter using a 0.5003 cm. cell. A portion of stock maltose solution without enzyme addition served as a control. All specific rotations were corrected to a standard of 130.7 for comparative purposes. The effect of the presence of the transglucosidase in the glucoamylase preparations was calculated as follows:

Rotation of maltose digest $$= \frac{|(A)-(B)|}{(C)\quad(D)} \times \frac{(E)\ (C)\ (D)}{|(A)-(F)|}$$

Where:

A=water reading in millidegrees
B=digest reading in millidegrees
C=cell length in cm. (0.5003)
D=percent dry substance (10)
E=substrate control reading (130.7)
F=substrate reading The greater the amount of transglucosidase present the greater will be the rotation of the digested maltose solution.

DETERMINATION OF GLUCOAMYLASE ACTIVITY 25 g. of soluble starch (Merck Lintner Starch—Special for Diastatic Power Determination) was heated, with stirring, in 700 ml. of distilled water to boiling and then held there for 5 minutes. The starch preparation was cooled to ambient temperature with constant stirring, the pH adjusted to 4.3±0.1 with 20 ml. of a 1.0 molar solution of acetate buffer (2 moles acetic acid at pH 4.3) and diluted to 1000 ml. with distilled water. Then 100 ml. of this starch substrate was pipetted into a 250 ml. Erlenmeyer flask, stoppered and attempered at 60° C. for 15 minutes in a constant temperature water bath. 50 ml. of glucoamylase preparation was diluted to a total volume of 2000 ml. A three-ml. aliquot of the diluted enzyme preparation was added to the starch substrate, mixed thoroughly, stoppered, and held for 1 hour in a water bath maintained at 60° C. At the end of 1 hour, 5 ml. of a 5 percent sodium hydroxide solution was added to terminate the enzyme action. The enzymatically converted hydrolysate was cooled to about 30° C.

Ten ml. of the hydrolysate was pipetted into a Fehling's titration flask containing 25 ml. of boiling Fehling's solution and titrated with a standard dextrose solution. Methylene blue was used as an indicator. A blank determination using 3 ml. of distilled water in place of the enzyme preparation was performed in the manner described above. The glucoamylase activity was calculated as follows:

$$\text{Glucoamylase Units/g.} = \frac{(B-D)\,(S)\,(T)\,(E)}{(F)\,(G)\,(H)\,(W)}$$

Where:

B=ml. of standard dextrose solution required for the control.
D=ml. of standard dextrose solution required for the enzymeatically converted hydrolysate.
S=g. of dextrose per ml. of a standard dextrose solution (0.005).
T=final volume of enzyme converted hydrolysate (108 ml.).
E=ml. of diluted enzyme solution (2000).
F=ml. of enzymatically converted hydrolysate titrated with Fehling's solution (10).
G=reaction time in hours (1).
H=ml. of diluted enzyme solution added to the substrate-buffer solution (3).
W=weight in g. of enzyme preparation used.

DEFINITION OF DEXTROSE EQUIVALENT

The abbreviation, DE, contained herein refers to "dextrose equivalent" and is defined as the reducing sugars expressed as dextrose and calculated as a percentage of the dry substance. The analysis was performed according to Method E–26 in the standard Analyticala Methods of the Member Companies of the Corn Industries Research Foundation.

Example I

This example shows the effect of various metal salts on the activity of glucoamylsae and transglucosidase.

Various salts of heavy metals were added to the stock maltose solutions described in the section above entitled "Determination of the Presence of Transglucosidase in Glucoamylase Preparations." These stock maltose solutions were dosed with a sufficient amount of a glucoamylase preparation obtained from an *Aspergillus niger* filtrate to obtain therein an activity of four glucoamylase units. The stock maltose solutions were held for 72 hours at 60° C. A decrease in the specific rotation as compared to the specific rotation of a control (no salt added) indicates the decrease of transglucosidase activity in the glucoamylase preparations. The results are shown in Table I below:

TABLE I

| Metals Salts Used (concentration of $1\times10^{-3}$ molar) | Rotation |
|---|---|
| Control (no salt used) | 54.91 |
| $AgNO_3$ | 53.48 |
| $HgCl_2$ | 54.00 |
| $BaCl_2 \cdot 2H_2O$ | 54.97 |
| $CaCl_2 \cdot 2H_2O$ | 54.87 |
| $CoCl_2 \cdot 6H_2O$ | 55.17 |
| $CuCl_2$ | 55.47 |
| $FeCl_2 \cdot 4H_2O$ | 56.01 |
| $PbCl_2$ | 55.91 |
| $MgCl_2 \cdot 6H_2O$ | 56.13 |
| $MnCl_2 \cdot 4H_2O$ | 55.61 |
| $NiCl_2 \cdot 6H_2O$ | 55.35 |
| KCl | 55.81 |
| $SnCl_2$ | 56.77 |
| $ZnCl_2$ | 55.21 |
| $CrCl_2 \cdot 6H_2O$ | 55.11 |

From the above, it is apparent that silver nitrate and mercuric chloride were the only salts that had a favorable effect on the quality of the glucoamylase preparations.

Example II

This example illustrates the effect of temperature, period of treatment and concentration of silver ions on the degree to which transglucosidase is inactivated in a glucoamylase preparation.

To a number of glucoamylase preparations derived from *Aspergillus niger,* containing 5.8 glucoamylase units per ml, was added $AgNO_3$. The amounts of $AgNO_3$, the temperature and period of treatment of the preparations are shown in Table II. After the preparations were treated, they were incorporated into the stock maltose solution described in the section above entitled "Determination of Presence of Transglucosidase in Glucoamylase Preparations," digested for 72 hours and the specific rotations determined. The specific rotations are set forth in Table II below.

TABLE II

| Sample Number | Conditions of treatment of glucoamylase preparation | | | | Rotation of Digest |
|---|---|---|---|---|---|
| | pH | Temp. (° C.) | Time (min.) | $AgNO_3$ conc. (molar) | |
| A | Control—no treatment | | | | 55.53 |
| B | 4.0 | 30 | 60 | $5\times10^{-2}$ | 53.19 |
| C | 4.0 | 30 | 60 | $3\times10^{-2}$ | 53.46 |
| D | 4.0 | 30 | 60 | $1\times10^{-2}$ | 55.05 |
| E | 4.0 | 40 | 30 | $1\times10^{-2}$ | 55.12 |
| F | 4.0 | 40 | 60 | $1\times10^{-2}$ | 55.04 |
| G | 4.0 | 50 | 30 | $1\times10^{-5}$ | 53.45 |
| H | 4.0 | 60 | 30 | $1\times10^{-2}$ | 53.24 |

From the above table it is seen that as the temperature of the treatment is increased lesser amounts of silver ions are necessary to inactivate the transglucosidase.

Example III

This example illustrates the interrelationship of pH and concentration of silver ions on the degree to which transglucosidase is inactivated.

Glucoamylase prepaartions derived from *Aspergillus niger* were treated according to the previous example unless otherwise shown in Table III below.

TABLE III

| Sample Number | Conditions of treatment of glucoamylase preparation | | | | Rotation of Digest |
|---|---|---|---|---|---|
| | pH | Temp. (° C.) | Time (min.) | $AgNO_3$ conc. (molar) | |
| A | Control—no treatment | | | | 55.53 |
| B | 4.0 | 50 | 30 | $1\times10^{-2}$ | 53.51 |
| C | 4.0 | 50 | 30 | $3\times10^{-3}$ | 55.62 |
| D | 3.0 | 50 | 30 | $3\times10^{-3}$ | 54.36 |
| E | 2.5 | 50 | 30 | $3\times10^{-3}$ | 53.46 |
| F | 2.0 | 50 | 30 | $3\times10^{-3}$ | 128.21 |

The results in the above table show that as the concentration of the silver ions is decreased lower pH's are required to substantially inactivate the transglucosidase in a glucoamylase preparation.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A method of treating an aqueous enzyme preparation containing glucoamylase and transglucosidase comprising providing in said aqueous enzyme preparation silver or mercuric ions or a mixture of said ions, maintaining the aqueous enzyme preparation under such conditions whereby the transglucosidase is substantially inactivated by said ions without substantially affecting the glucoamylase.

2. A method of treating an aqueous enzyme preparation as defined in claim 1, wherein the aqueous enzyme preparation is maintained at a temperature of from about ambient to about 60° C. during the treatment.

3. A method of treating an aqueous enzyme preparation as defined in claim 2, wherein silver ions are provided in said enzyme preparation.

4. A method of treating an aqueous enzyme preparation as defined in claim 3, wherein a sufficient concentration of silver ions is provided in said enzyme preparation to obtain a silver ion molarity of from about $1\times10^{-6}$ to about $8\times10^{-1}$.

5. A method of treating an aqueous enzyme preparation as defined in claim 4, wherein a sufficient concentration of silver ions is provided in said enzyme preparation to obtain a silver ion molarity of from about $7\times10^{-2}$ to about $7\times10^{-3}$.

6. A method of treating an aqueous enzyme preparation as defined in claim 2, wherein a sufficient concentration of mercuric ions is provided in said enzyme preparation to obtain a mercuric ion molarity on from about $1\times10^{-6}$ to about $6\times10^{-2}$.

7. A method of treating an aqueous enzyme preparation as defined in claim 4, wherein the aqueous enzyme preparation is maintained at a temperature of from about 30° C. to about 50° C. during the treatment.

8. A method of treating an aqueous enzyme preparation as defined in claim 6, wherein the aqueous enzyme preparation is maintained at a temperature of from about 30° to about 50° C. during the treatment.

9. A method of treating an aqueous enzyme preparation as defined in claim 7, wherein the pH of the preparation during the treatment is maintained in the range of from about 2 to about 4.5.

10. A method of treating an aqueous enzyme preparation as defined in claim 8, wherein the pH of the preparation during the treatment is maintained in the range of from about 3 to about 4.

References Cited

UNITED STATES PATENTS 3,380,892   4/1968   Garbutt _____ 195—31 R

LIONEL M. SHAPIRO, Primary Examiner

U.S. Cl. X.R.

195—31 R